(No Model.)
J. T. LEACH.
SANDPAPERING MACHINE.
No. 552,066. Patented Dec. 24, 1895.
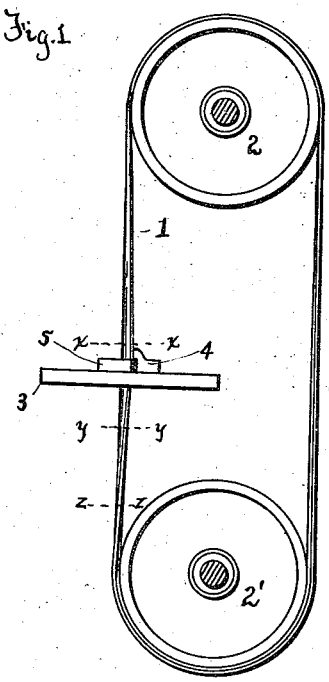
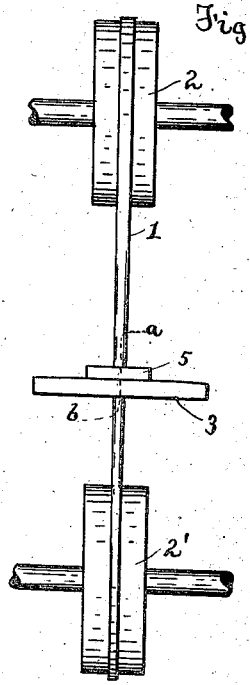
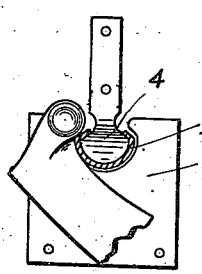
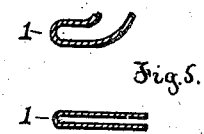
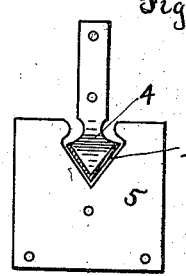
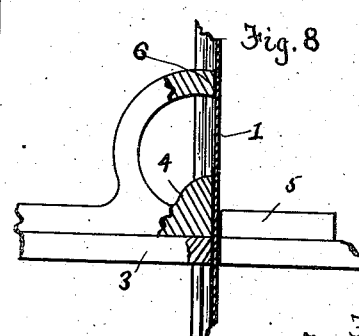
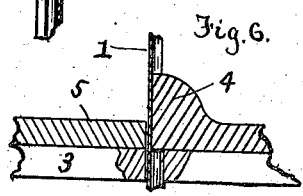
Witnesses
J. E. Bates.
Thomas Durant
Inventor
John T. Leach
By Church & Church
His Attorneys.

UNITED STATES PATENT OFFICE.

JOHN T. LEACH, OF ROCHESTER, NEW YORK.

SANDPAPERING-MACHINE.

SPECIFICATION forming part of Letters Patent No. 552,066, dated December 24, 1895.

Application filed December 23, 1893. Serial No. 494,552. (No model.)

*To all whom it may concern:*

Be it known that I, JOHN T. LEACH, of Rochester, in the county of Monroe and State of New York, have invented certain new and useful Improvements in Sandpapering-Machines; and I do hereby declare the following to be a full, clear, and exact description of the same, reference being had to the accompanying drawings, forming a part of this specification, and to the reference-numerals marked thereon.

Heretofore in the manufacture of fine woodwork it has been practically impossible to smooth or remove the saw-marks from some of the parts of articles of furniture, such as chair-backs, excepting by the slow and expensive process of hand-filling them, which not only consumes considerable time but requires the services of a skilled operator, and it is therefore the object of my present invention to provide a machine which will sandpaper very rapidly the corners or irregular edges heretofore incapable of being sandpapered or smoothed excepting by the use of hand-tools; and to these and other ends the invention consists in certain improvements in construction and combinations of parts, all as will be hereinafter fully described, and the novel features pointed out in the claims at the end of this specification.

In the drawings, Figure 1 is a side elevation of a machine constructed in accordance with my invention; Fig. 2, a front elevation of the same; Fig. 3, a sectional view on the line x x of Fig. 1, looking downward; Fig. 4, a sectional view on the line y y of Fig. 1; Fig. 5, a similar view on the line z z of Fig. 1; Fig. 6, a sectional view on the line a b of Fig. 2; Fig. 7, a view of a modified form of device; Fig. 8, a sectional view corresponding to Fig. 6 of a modification.

Similar reference-numerals in the several figures indicate similar parts.

In carrying out my invention I employ an endless band 1, preferably of ordinary sandpaper, (though it may be of cloth or similar flexible material covered with sand,) passing over two pulleys 2 2', the latter rotated from a suitable motor and constituting the belt-driving pulley. 3 indicates a work-table supported upon suitable legs or brackets and having an aperture through which the sandpaper-belt passes, and arranged back of the belt where it passes through said table is a belt-support 4 composed of unyielding material, preferably iron or steel, and having its forward portion shaped in practically the form it is desired to have the working portion of the belt assume, which will, of course, vary with the different articles or parts of the same article it is desired to operate upon. In the drawings I have shown this belt guide or block as provided with a rounded face and sharp corners at the ends thereof, which I find in practice is desirable for some classes of work— as, for instance, chair-backs constructed as shown in Fig. 3. The belt is applied to one of the pulleys with its abrading side out, and after passing over the surface of the guide or block 4 and being shaped thereby extends around the lower or driving pulley folded, one-half upon the other, as shown in Fig. 5, whereby not only is the belt afforded a better grip on the driving-pulley and prevented from slipping, but also it is thus made to more nearly conform to the irregular shape of the belt-guides, and is strengthened and prevented from being accidentally torn or broken. Arranged in front of the belt support or guide 4, but below the working face thereof, is a forward guide-block 5, preferably shaped to correspond with the rear guide and projecting in close proximity thereto, sufficient space of course being allowed for the passage of the belt and dust, though the guide will resist any tendency on the part of the belt to work off the rear guide and become displaced. In the construction shown this front guide is applied to the upper side of the table and serves to support the work, but it is obvious that it could be inserted in an aperture therein, but in either case the belt-support 4 must project sufficiently above the guide-block 5 to support the belt as the work is pressed against it.

It will be understood that in operation the article to be smoothed is pressed against the face of the belt, which is supported and given the proper shape by the back guide, as above described, and as both the back and front guides or supports are capable of being removed and others of different shape readily substituted various articles or different parts of the same article can readily be finished on this machine at very slight cost.

In Fig. 7 I have shown V-shaped belt-guides, which I find advantageous in practice, the belt being preferably creased slightly longitudinally, and after passing from said guides being turned over upon itself and passed doubled around the driving-pulley.

Sometimes it is desirable to smooth articles having rounded surfaces, and in order that this may be accomplished and at the same time to enable the operations before described to be carried out I provide above the back belt-guide 4 an additional guide 6, which may, if desired, be formed integral with the former, as shown in Fig. 8. This will cause the belt to assume the shape of the guides to enable the peculiar corners for which the guides are adapted to be operated upon, and will afford sufficient room above the table to permit the manipulation of the article to bring all parts against the belt.

I claim as my invention—

1. In a sand-papering machine, the combination with the supporting pulleys, of the sand-belt, and a rigid back-guide therefor, said belt being folded and passed around one of its pulleys with a portion of its abrading surface in contact therewith, substantially as described.

2. In a sand-papering machine, the combination with the supporting pulleys, of the sand-belt, and the shaped front and back guides therefor, said belt being folded and passed around one of its pulleys with a portion of its abrading surface in contact therewith, substantially as described.

3. In a sand-papering machine, the combination with the sand-belt and its supporting pulleys, of the rigid back and front belt guides, and the additional back guide arranged above the first mentioned one with a space between for the manipulation of the article operated upon, substantially as described.

JOHN T. LEACH.

Witnesses:
WM. A. HUBBARD, Jr.,
FRED F. CHURCH.